(12) United States Patent
Ozue et al.

(10) Patent No.: US 6,549,356 B1
(45) Date of Patent: Apr. 15, 2003

(54) ROTARY DRUM AND MAGNETIC TAPE RECORDING/REPRODUCING APPARATUS USING THE SAME

(75) Inventors: Tadashi Ozue, Kanagawa (JP); Toshio Shirai, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/705,246

(22) Filed: Nov. 2, 2000

(30) Foreign Application Priority Data

Nov. 2, 1999 (JP) .......................... P11-312306

(51) Int. Cl.[7] .......................... G11B 15/14; G11B 5/91; G11B 5/932
(52) U.S. Cl. .................. 360/64; 386/74; 386/81
(58) Field of Search .................. 360/64, 70, 76; 386/74, 81

(56) References Cited

U.S. PATENT DOCUMENTS 5,706,385 A * 1/1998 Suzuki et al. ............ 386/34
5,912,780 A * 6/1999 Yamada et al. ............ 360/64

* cited by examiner

Primary Examiner—Regina N. Holder
(74) Attorney, Agent, or Firm—Sonnenschein, Nath & Rosenthal

(57) ABSTRACT

There is provided a rotary drum which is capable of increasing recording density of a magnetic tape by changing tape/head relative speed and by solving problems which occur in increasing the tape/head relative speed. The inventive rotary drum includes a pair of recording heads having different azimuth angles and disposed separately with 180° of central angle and a second recording head disposed at the same position in the circumferential direction with one recording head among the pair of recording heads while separating by 5.5 μm in the direction of height of the rotary drum and having a different azimuth angle from the one recording head. A first mode is created by the pair of recording heads separated by 180° of central angle and a second mode is created by the two recording heads at the same position in the circumferential position.

4 Claims, 11 Drawing Sheets

ROTARY DRUM AND MAGNETIC TAPE RECORDING/REPRODUCING APPARATUS USING THE SAME

RELATED APPLICATION DATA

The present application claims priority to Japanese Application No. P11-312306 filed Nov. 2, 1999, which application is incorporated herein by reference to the extent permitted by law.

BACKGROUND OF THE INVENTION

1. Field of the Invention

The present invention relates to a rotary drum and a magnetic tape recording/reproducing apparatus using the same or more specifically to technology which allows recording density of a magnetic tape to be changed by changing tape/head relative speed and recording density to be increased by solving problems which have occurred in increasing the tape/head relative speed.

2. Related Art Statement

Among magnetic tape recording/reproducing apparatuses, there has been one which reproduces information by means of reproducing heads while recording information on a tape recording medium by means of recording heads.

For instance, a magnetic tape streamer drive unit known as a computer data recording apparatus reproduces information while recording the information to a tape recording medium to check whether or not the information has been correctly recorded. Such function is called as RAW (Read after Write) function. In order to realize such function, a rotary drum is provided with recording heads and reproducing heads and a rotary transformer is provided with recording system channels and reproducing system channels for transmitting signals to the recording heads and for transmitting signals from the reproducing heads.

FIGS. 9 through 11 show one example of a prior art rotary drum for realizing such RAW function, wherein FIG. 9 is a schematic plan view for explaining the positional relationship of the respective heads and FIG. 10 is a schematic side view of the rotary drum.

The rotary drum a is provided with the two recording heads bA and bB and two reproducing heads cA and cB separately with 180° of central angle as shown in FIG. 9. The recording head bA has an azimuth angle A and the recording head bB has an azimuth angle B. The reproducing head cA has an azimuth angle A and the reproducing head cB has an azimuth angle B.

The recording heads bA and bB are disposed with a certain gap, e.g., 11 μm, in the direction of a rotary shaft (in the direction of height) of the rotary drum a and the reproducing heads cA and cB are also disposed with a certain gap, e.g., 11 μm, in the same manner with the recording heads bA and bB as shown in FIG. 10. It is noted that FIG. 9 shows the recording heads bA and bB and the reproducing heads cA and cB by arranging in the circumferencial direction in order to represent the respective heads on a plan view.

Thereby, recording tracks Ta having the azimuth angle A and recording tracks Tb having the azimuth angle B are recorded on the magnetic tape d separately with the gap between the recording head bA and recording head bB (gap in the direction of height of the drum, e.g., 11 μm) as shown in FIG. 11.

However, because the track pitch Tp of the recording tracks recorded on the magnetic tape d by the prior art rotary drum a as described above is equal to the gap between the recording heads bA and bB (gap in the direction of height of the drum, e.g., 11 μm) and is constant, it is unable to change the recording density of the magnetic tape d (see FIG. 11).

Then, it is conceivable to dispose two recording heads eA and eB and two reproducing heads cA and cB by separating them by 180° of central angle as shown in FIG. 12.

Thereby, the track pitch Tp may be changed by changing tape/head relative speed.

That is, the distance between the recording track Ta and the recording track Tb (track pitch Tp) is determined by the tape/head relative speed. The track pitch Tp increases as the tape/head relative speed increases and the pitch decreases as the speed decreases. Thereby, the recording density of the magnetic tape d may be changed by changing the tape/head relative speed.

However, when the tape/head relative speed is increased to increase the recording density by disposing the two recording heads 6A and 6B by separating by 180° of central angle as described above, there has been a problem that the neighboring recording tracks Ta and Tb are liable to overlap.

That is, the rotary drum a sometimes causes precession which bends slightly and helically the recording tracks Ta and Tb formed on the magnetic tape d when spread in plan as shown in FIG. 13.

As it is apparent from FIG. 13, when the rotary drum a causes precession, a locus of an arbitrary point thereof is S-shaped in one turn (360°) when spread in plan and a locus which bends upward or downward is formed in a half turn (180°).

Then, when the two recording heads bA and bB create such S-shaped locus by semicircle each (180° each), two recording tracks are formed abreast. The locus of one recording head bA becomes the recording track Ta which bulges upward and the locus of the other recording head bB becomes the recording track Tb which bulges downward. Thus, the bulged parts become closer to each other as compared to the other parts and the two recording tracks Ta and Tb overlap each other in some cases.

Accordingly, there has been a problem that even if the track pitch is reduced by disposing the two recording heads bA and bB separately with 180° of central angle and by increasing the tape/head relative speed, the track pitch cannot be reduced so much and the increase of the recording density is limited.

SUMMARY OF THE INVENTION

Accordingly, it is an object of the invention to provide a rotary drum which realizes a plurality of modes with regard to recording density of a magnetic tape by changing tape/head relative speed and increases the recording density by solving the limit of the increase of recording density implemented by increasing the tape/head relative speed.

It is another object of the invention to provide a magnetic tape recording/reproducing apparatus which realizes a plurality of modes with regard to recording density of a magnetic tape corresponding to different tape/head relative speeds and increases the recording density by solving the limit of the increase of recording density implemented by increasing the tape/head relative speed.

In order to achieve the above-mentioned objects, an inventive rotary drum comprises a pair of recording heads having different azimuth angles and disposed separately with 180° of central angle and a second recording head disposed at the same position in the circumferential direction with at least one recording head among the pair of recording heads while leaving a predetermined gap in the direction of height of the rotary drum and having a different azimuth angle from the one recording head.

Accordingly, because the pair of recording heads are disposed separately with 180° of central angle on the inventive rotary drum, the plurality of modes may be realized with regard to the recording density of the magnetic tape by varying the tape/head relative speed. Further, because the second recording head is disposed by leaving the certain gap (gap in height) in the direction of height from one recording head, the parallel of the two recording tracks created by such gap in height may be maintained. Therefore, the recording density may be increased by setting a mode so that such gap in height becomes the smallest track pitch.

According to a second aspect of the invention, the drum further comprises a dummy head having almost the same mass with the second recording head at the position separated from the second recording head by 180° of central angle, so that it is possible to eliminate the weightwise eccentricity of the rotary drum and to prevent nonuniformity of rotation in rotating the drum.

An inventive magnetic tape recording/reproducing apparatus has a rotary drum comprising a pair of recording heads having different azimuth angles and disposed separately with 180° of central angle and a second recording head disposed at the same position in the circumferential direction with at least one recording head among the pair of recording heads while leaving a predetermined gap in the direction of height of the rotary drum and having a different azimuth angle from one recording head. The apparatus has two or more modes with regard to tape/head relative speed of tape recording medium.

Accordingly, because the pair of recording heads are disposed separately with 180° of central angle in the inventive magnetic tape recording/reproducing apparatus, the plurality of modes may be realized with regard to the recording density of the magnetic tape by varying the tape/head relative speed. Further, because the second recording head is disposed by leaving the certain gap (gap in height) in the direction of height from one recording head, the parallel of the two recording tracks created by such gap in height may be maintained. Therefore, the recording density may be increased by setting a mode so that such gap in height becomes the smallest track pitch.

DESCRIPTION OF THE PREFERRED EMBODIMENTS

An inventive rotary drum and a magnetic tape recording/reproducing apparatus using the same will be explained below in detail in accordance to preferred embodiments shown in the appended drawings.

Figure 1:
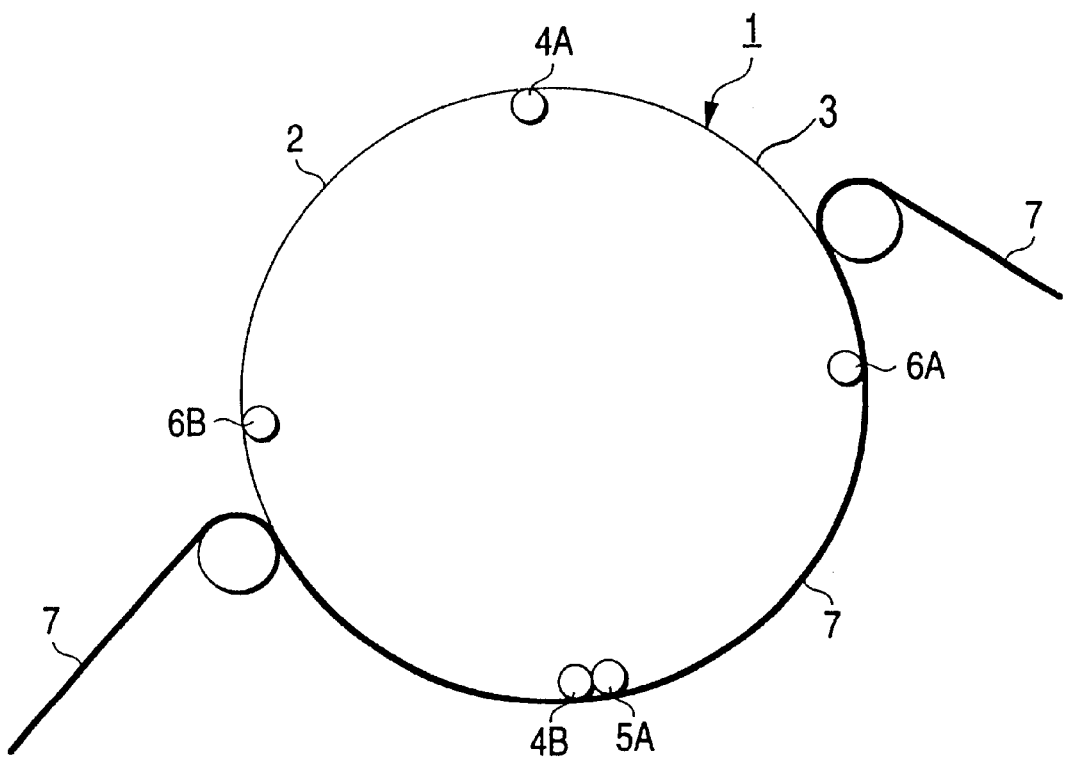
FIG. 1 shows an embodiment of the invention together with FIGS. 2 through 5 and specifically is a plan view schematically showing a rotor side drum.

FIG. 1 is a schematic plan view of the rotary drum 1 for explaining the positional relationship of respective heads. The rotary drum 1 comprises a rotor side drum 2 and a stator side drum 3. The rotor side drum 2 has a pair of recording heads 4A and 4B disposed separately with 180° of central angle, a second recording head 5A disposed at the same position in the circumferential direction with one recording head 4B among the pair of recording heads while leaving a certain gap (gap in height) in the direction of height of the rotary drum 1 and two reproducing heads 6A and 6B disposed separately from each other with 180° of central angle. The recording head 4A, the reproducing head 6A, the recording head 4B (second recording head 5A) and the reproducing head 6B are disposed at equal intervals in the circumferential direction, i.e., separately with 90° of central angle, as shown in FIG. 1. The respective heads 4A, 4B, 6A and 6B are disposed at the same position in terms of the direction of the rotary shaft (in the direction of height of the rotary drum 1) and the recording head 4B and the second recording head 5A are disposed separately by 5.5 $\mu$m for example, in the direction of height. It is noted that MR heads are adopted for the reproducing heads 6A and 6B.

The recording head 4A and the second recording head 5A have an azimuth angle A, the recording head 4B has an azimuth angle B, the reproducing head 6A has an azimuth angle A and the reproducing head 6B has an azimuth angle B.

Figure 2:
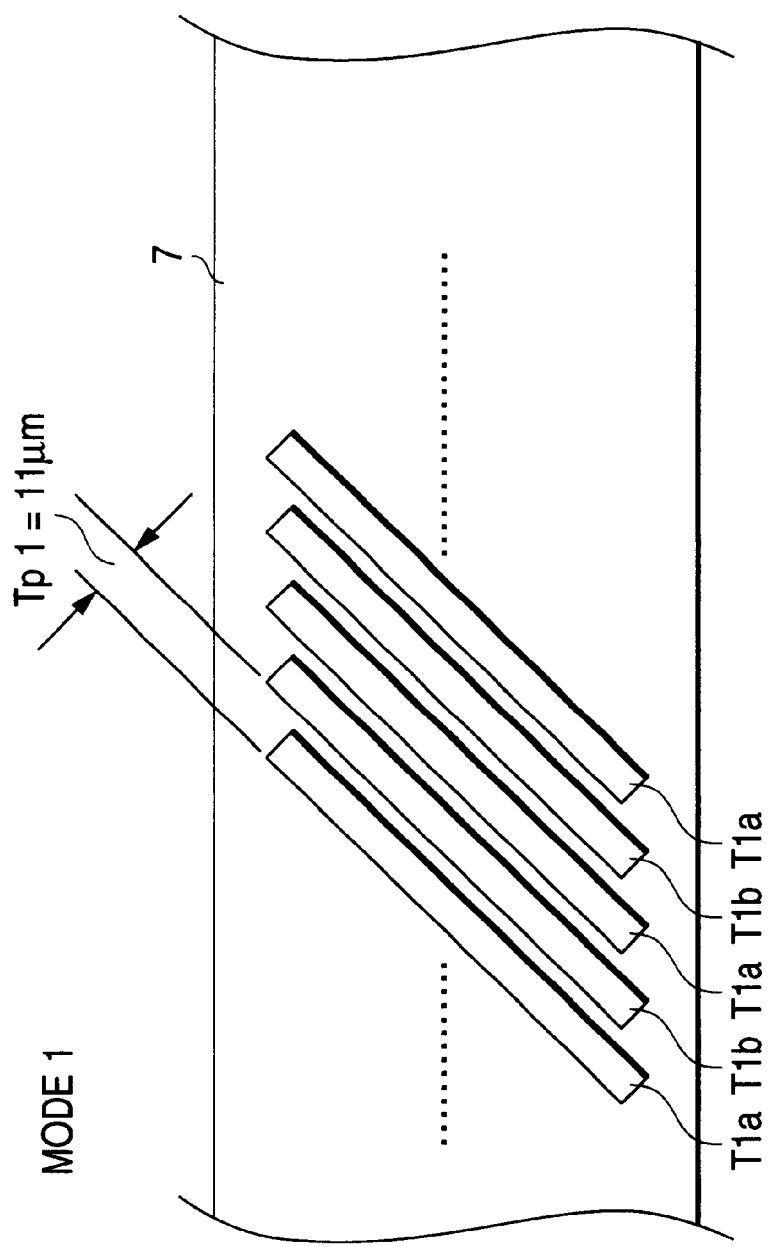
FIG. 2 is a recording pattern diagramatically showing tracks recorded on a magnetic tape in a first mode.
Figure 3:
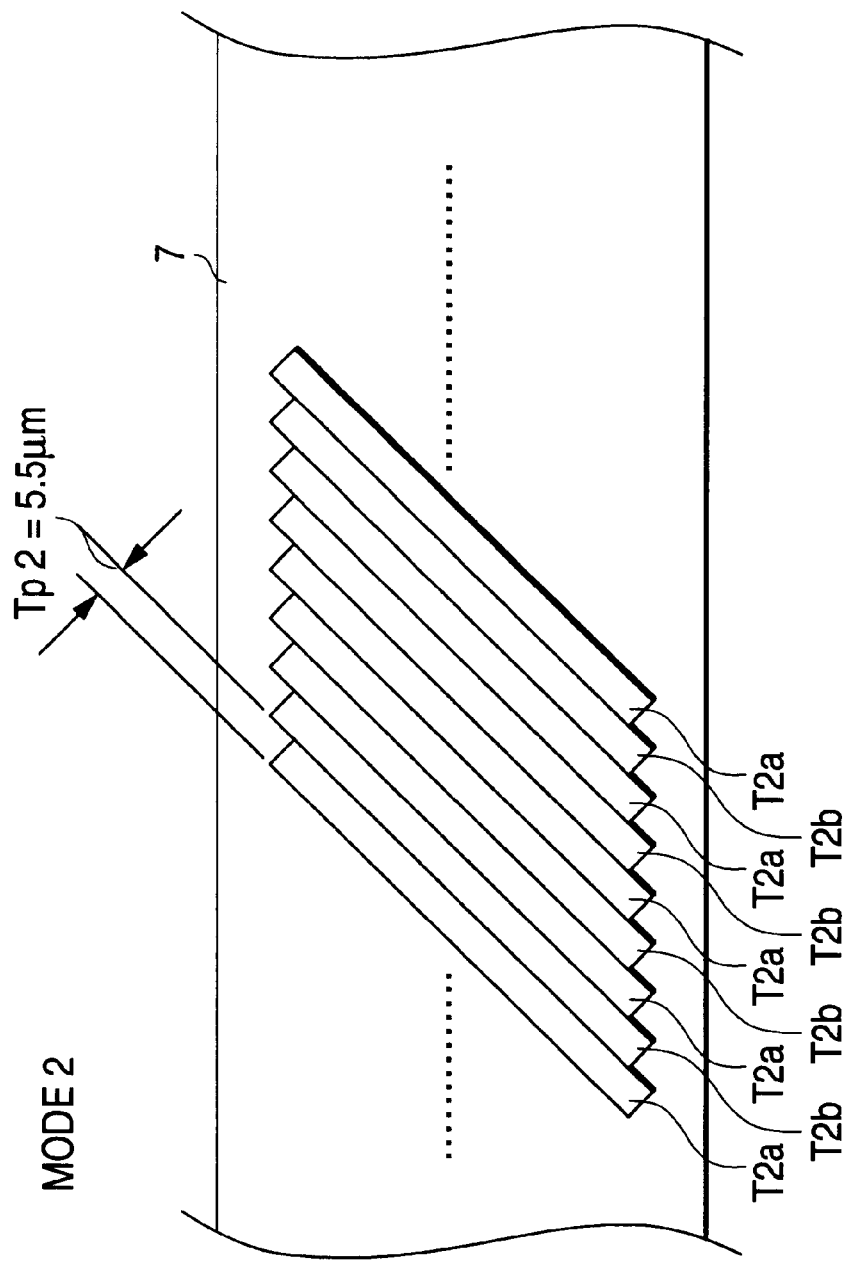
FIG. 3 is a recording pattern diagramatically showing tracks recorded on a magnetic tape in a second mode.

A magnetic tape 7 is wrapped around to the rotary drum 1 aslant with an angle of 180° or more. Thereby, recording tracks Ta and Tb are formed aslant with a predetermined angle. The recording tracks Ta having the azimuth angle A and the recording tracks Tb having the azimuth angle B are formed adjacent to each other as shown in FIGS. 2 and 3.

The rotary drum 1 described above has a first mode (see FIG. 2) of forming the first recording tracks T1a and T1b by the recording heads 4A and 4B and a second mode (see FIG. 3) of forming the second recording tracks T2b and T2a by the recording head 4B and the second recording head 5A.

In forming the recording tracks by the recording heads 4A and 4B separated from each other by 180° (first mode), the track pitch Tp1 is determined by the tape/head relative speed as described above. The pitch increases as the tape/head relative speed increases and decreases as the speed decreases. Thus, the recording density of the magnetic tape 7 depends on the tape/head relative speed.

Then, the tape/head relative speed is controlled so that the track pitch Tp1 is set at 11 $\mu$m for example in the first mode.

Here, although there is a case when the recording tracks T1a and T1b are formed curvedly by the precession of the rotary drum 1, the recording tracks T1a and T1b will not overlap each other because the track pitch Tp1 is set at 11 $\mu$m.

While it is necessary to read the recording tracks T1a and T1b by the reproducing heads 6A and 6B immediately after forming the tracks by the recording heads 4A and 4B in order to realize the RAW function described above, the recording tracks T1a and T1b are scanned with the same tape/head relative speed because the reproducing heads 6A and 6B are also separated from each other by 180°.

Next, in recording the recording tracks T2b and T2a in the second mode by the recording head 4B and the second recording head 5A, the tape/head relative speed must be set at twice of that of the first mode.

The two recording tracks T2b and T2a formed by the two recording heads 4B and 5A disposed at the same position in the circumferential direction while leaving an arbitrary gap (gap in height) in the direction of height do not depend on the tape/head relative speed. The gap in height=5.5 μm between the recording heads 4B and 5A becomes a track pitch Tp2=5.5 μm in the second mode, so that the tape/head relative speed may be set at any speed.

However, the recording tracks T2a and T2b must be read almost in the same time by the reproducing heads 6A and 6B in order to realize the RAW function and the reproducing heads 6A and 6B must scan the recording tracks T2a and T2b by the same tape/head relative speed. Accordingly, the intervals of the loci scanned by the reproducing heads 6A and 6B must coincide with the track pitch Tp2=5.5 μm of the recording tracks T2a and T2b described above.

The recording tracks T2a and T2b formed by the recording heads 4A and 5A may be read by setting the tape/head relative speed at twice of that of the first mode.

While the track pitch Tp2 has been set at 5.5 μm in the second mode to set at a half of the track pitch Tp1=11 μm in the first mode, the both recording tracks T2a and T2b will not overlap each other even if the rotary drum 1 causes precession because the adjacent recording tracks T2a and T2b bend in the same direction.

Thus, it is necessary to set the track pitch Tp1 to the degree by which the adjacent recording tracks T1a and T1b do not overlap by the precession of the rotary drum 1 because the recording tracks T1a and T1b are formed by the two recording heads 4A and 4B separated by 180° of central angle in the first mode as described above. Accordingly, the track pitch Tp1 may be able to set the smaller track pitch T by lowering an allowance of axial deviation of the rotary drum 1 caused by the precession.

Then, it is preferable to decide the second track pitch Tp2 after setting the track pitch Tp1 in the first mode because the track pitch Tp2 in the second mode may be reduced as compared to the track pitch Tp1 in the first mode.

By the way, it is conceivable that crosstalk between respective channels in a rotary transformer 8 for transmitting signals to those recording heads 4A and 4B or to the stator side from the reproducing heads 6A and 6B may cause a problem because the two recording heads 4A and 4B and the reproducing heads 6A and 6B are disposed separately with 180° of central angle.

Then, it is effective to arrange the rotary transformer 8 as described below to carry out the invention (see FIGS. 4 and 5).

The rotary transformer 8 comprises channels 9a, 9b, 10a and 11 respectively corresponding to the heads 4A, 4B, 5A, 6A and 6B, a power system channel 12 for transmitting power to amplifiers described below for the reproducing heads 6A and 6B and a short ring 13 as a shield channel for preventing crosstalk from the power system channel 12. It is noted that there is provided only one reproducing system channel 11 to reduce a number of channels by selectively connecting the reproducing heads 6A and 6B to the reproducing system channel 11 by a switch described later. It is noted that reproducing system channels may be provided respectively for the reproducing heads 6A and 6B.

Each of the channels 9, 10, 11, 12 and 13 comprises a rotor side element r and a stator side element s. Each of these elements r and s, i.e., coils wound in ring, is stored within a ringed groove so as to face to each other.

Figure 4:
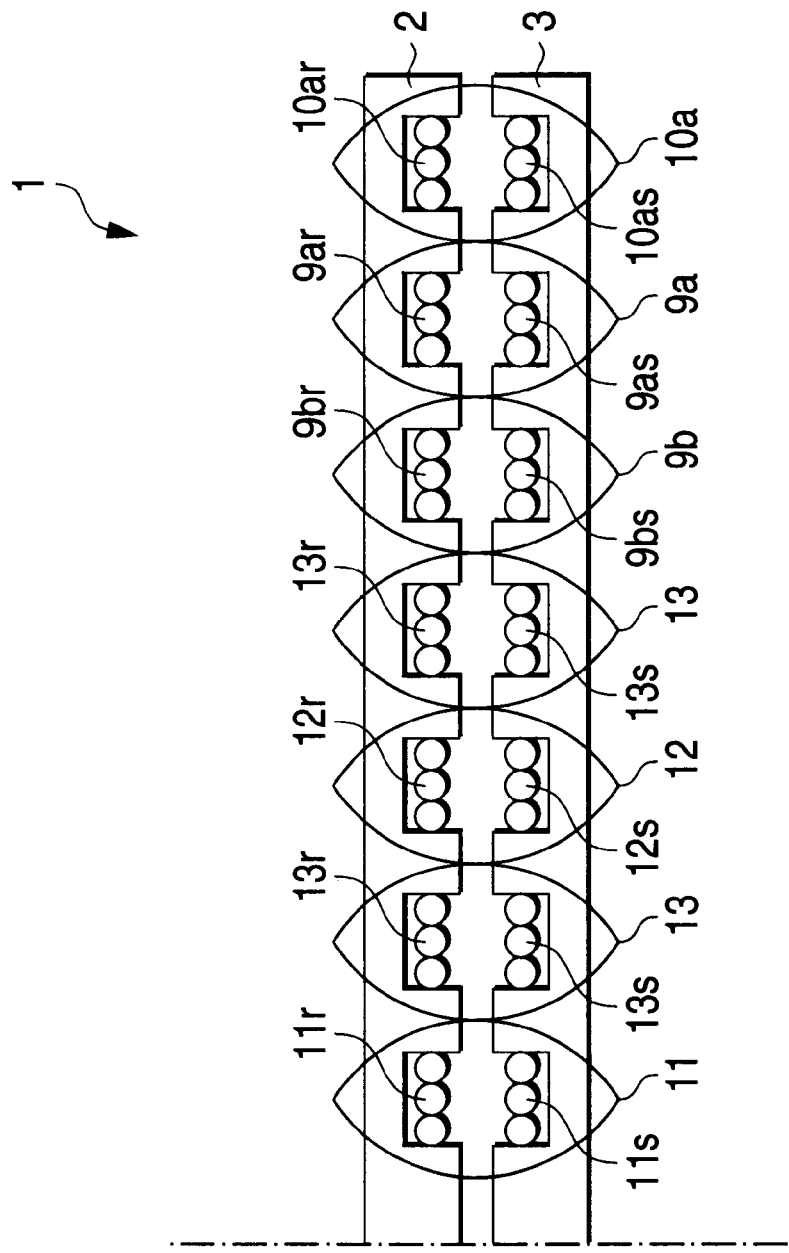
FIG. 4 is a schematic section view of a rotary transformer.

Then, the respective channels are arrayed in order of the reproducing system channel 11, a short ring 13, the power system channel 12, the short ring 13, the recording system channel 9b, the recording system channel 9a and the recording system channel 10a from the center of rotation of the rotary transformer 8 as shown in FIG. 4.

A stator side element 12s of the power system channel 12 of the rotary transformer 8 is connected to a power drive amplifier 14 and to an oscillating circuit 15 to transmit a power signal to a rotor side element 12r.

Figure 5:
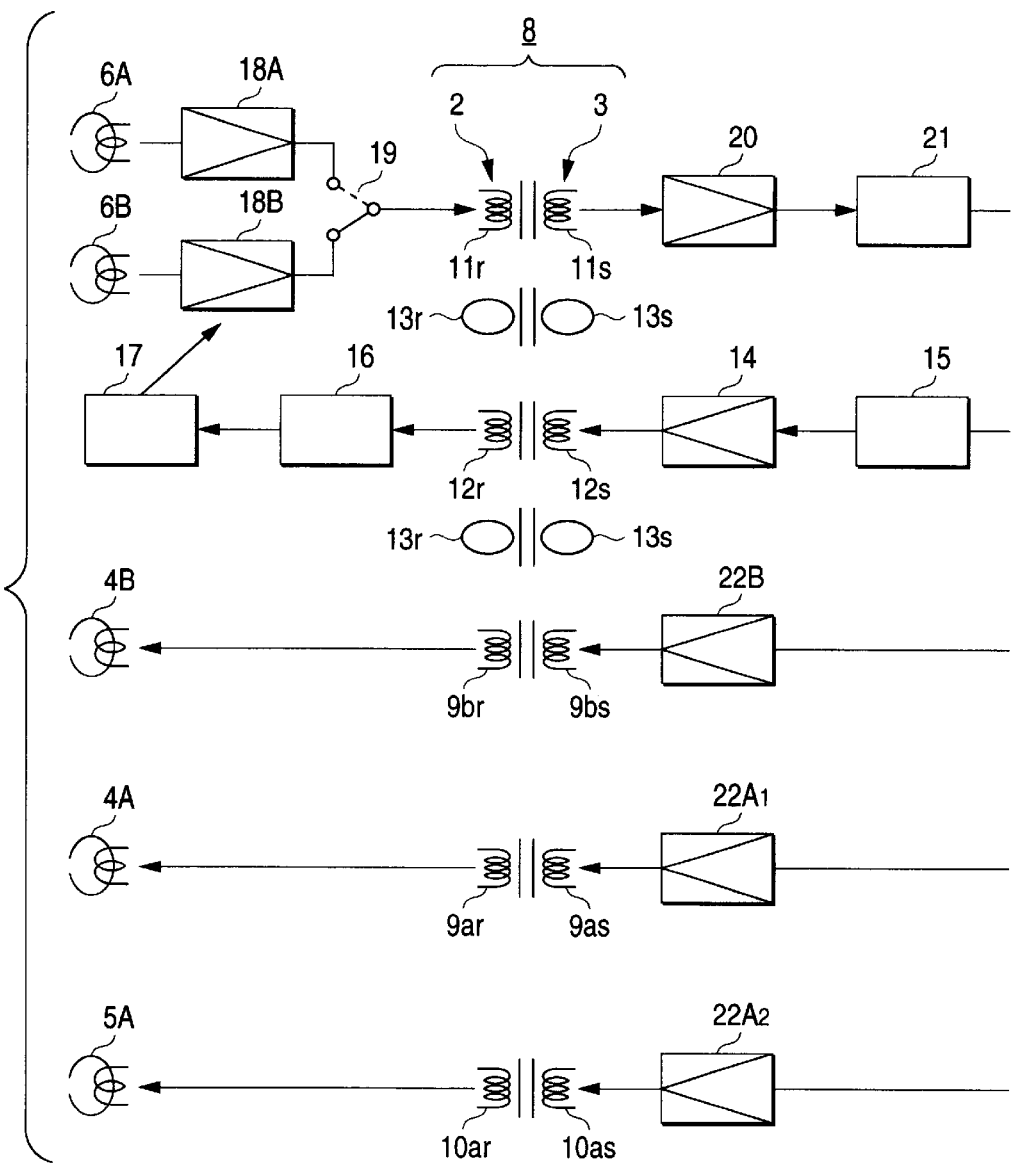
FIG. 5 is a schematic circuit diagram.

The power signal transmitted to the rotor side element 12r of the power system channel 12 is supplied to amplifiers 18A and 18B for the reproducing heads 6A and 6B via a rectifying and smoothing circuit 16 and a regulator 17 as shown in FIG. 5.

Reproduced signals reproduced by the reproducing heads 6A and 6B are amplified by the amplifiers 18A and 18B, respectively, and are supplied to the rotor side element 11r of the reproducing system channel 11 after being switched by a switch 19. It is then transmitted to the stator side element 11s of the reproducing system channel 11 to be outputted via a reproducing amplifier 20 and an equalizer 21 as shown in FIG. 5.

It is noted that the reproducing heads 6A and 6B read the recording signals both in the first and second modes in the same manner.

The recording signal is recorded to the magnetic tape 7 as follows. It is noted that this will be explained separately in the first and second modes.

In case of the first mode, the recording signals are amplified, respectively, by recording amplifiers 22A and 22B disposed at the stator side and are supplied to stator side elements 9as and 9bs of the recording system channels 9a and 9b. Then, they are transmitted to rotor side elements 9ar and 9br of the recording system channels 9a and 9b and are supplied respectively to the recording heads 4A and 4B to be recorded to the magnetic tape 7.

Next, in case of the second mode, the recording signals are amplified respectively by the recording amplifiers 22B and 22A$_2$ disposed on the stator side and are supplied to the stator side elements 9bs and 10as of the recording system channels 9b and 10a. Then, they are transmitted to the rotor side elements 9br and 10ar of the recording system channels 9b and 10a and are supplied respectively to the recording heads 4B and 5A to be recorded to the magnetic tape 7.

The respective channels 9a, 9b, 10a, 11 and 12 (except of the short rings 13) operate as follows. It is noted that the operation of the respective channels in the first and second modes will be explained, respectively.

Figure 6:
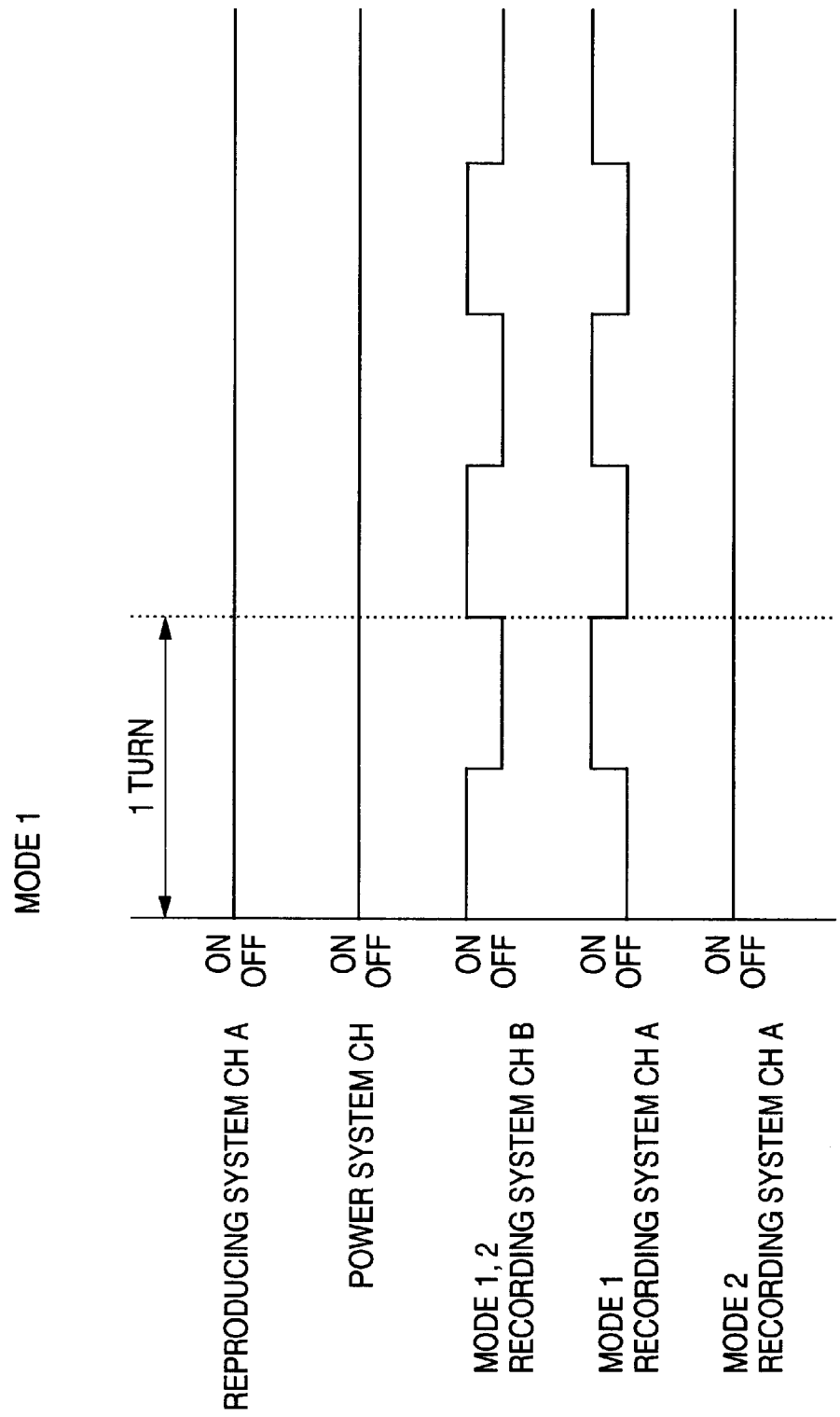
FIG. 6 is a timing chart showing operational states of respective channels in the first mode.

FIG. 6 is a timing chart showing the operations (transmitting state) of the respective channels 9a, 9b, 11 and 12 (except of the short rings 13) of the rotary transformer 8 in the first mode.

As it is apparent from FIG. 6, because the two recording heads 4A and 4B are disposed separately with 180° of central angle in the circumferential direction of the rotary drum 1, the recording system channel 9a or 9b operates while the recording head 4A or 4B contacts with the magnetic tape 7, i.e., by semicircle of the rotary drum 1, and the other recording system channel 9b or 9a operates in the next semicircle because the recording head 4B or 4A contacts with the magnetic tape 7.

Thereby, the other one of the two recording system channels 9a and 9b does not operate when one of them operates, so that they do not overlap temporally and no crosstalk occurs between them. It is noted that either one of the recording system channels 9a and 9b always thus operates.

The two reproducing heads 6A and 6B are disposed separately with 180° of central angle in the circumferential direction of the rotary drum 1 as described above. The reproduced signals read by those reproducing heads 6A and 6B are amplified respectively by the amplifiers 18A and 18B and are supplied to the rotor side element 11r of one reproducing system channel 11 to be transmitted to the stator side element 11s. Therefore, the reproducing system channel 11 always operates.

Then, although either one of the recording system channel 9a or 9b and the reproducing system channel 11 always operate in the same timing, no crosstalk occurs between the reproducing system channel 11 and the recording system channel 9a or 9b because the short ring 13 and the power system channel 12 interposed between the reproducing system channel 11 and the recording system channel 9a or 9b as described above function as shield channels.

Figure 7:
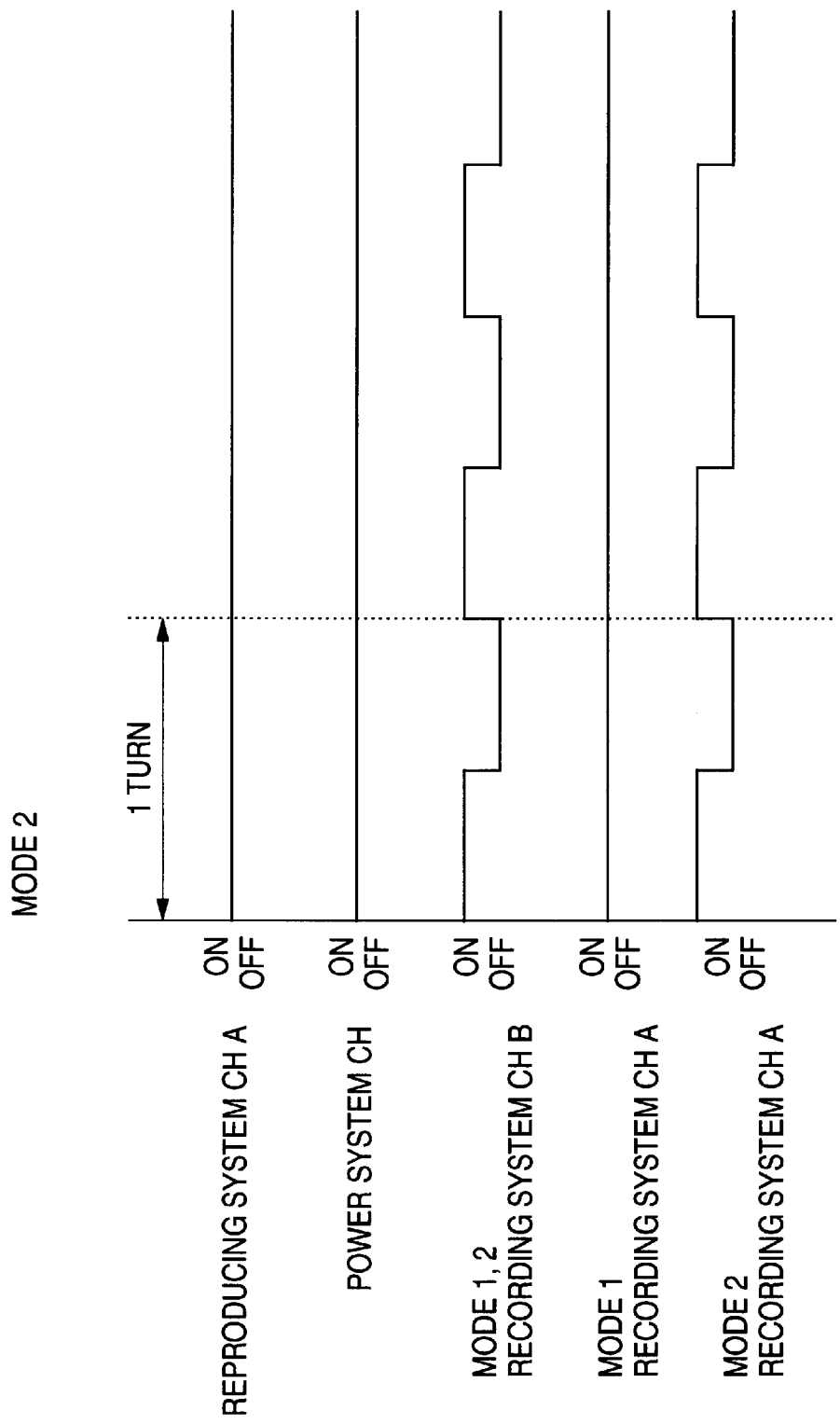
FIG. 7 is a timing chart showing operational states of respective channels in the second modes.

FIG. 7 is a timing chart showing the operations (transmitting state) of the respective channels 9b, 10a, 11 and 12 (except of the short rings 13) of the rotary transformer 8 in the second mode.

As it is apparent from FIG. 7, because the two recording heads 4A and 4B are disposed at the same position in the circumferential direction of the rotary drum 1, the recording system channel 9a or 10a operates in the same timing and the operating time overlap temporally. Then, although crosstalk between both channels 9b and 10a is questioned, no crosstalk occurs between the two channels 9b and 10a because the recording system channel 9a is disposed between the both channels 9b and 10a and it functions as a shield channel.

Further, although the reproducing system channel 11 overlaps temporally with the recording system channels 9b and 10a while they operate because the reproducing system channel 11 operates in the same manner with the first mode, no crosstalk occurs between the reproducing system channel 11 and the recording system channels 9b and 10a as described above.

It is noted that although the power system channel 12 must be always operated because it drives the amplifiers 18A and 18B of the reproducing heads 6A and 6B when the reproducing heads 6A and 6B read the recording signals of the magnetic tape 7 and crosstalk between the power system channel 12 and the recording system channel 9a and the reproducing system channel 11b is questioned, no crosstalk occurs between them because their short rings 13, 13r1 and 13s1 or 13r2 and 13s2 are interposed.

Thus, the first mode in which the recording track Tp1=11 μm may be formed by operating the recording heads 4A and 4B and the recording system channels 9a and 9b respectively connected thereto or the second mode in which the recording track Tp2=5.5 μm may be formed by operating the recording heads 4B and 5A and the recording system channels 9b and 10a respectively connected thereto on the rotary drum 1. In particular, the recording tracks T will not overlap because the recording tracks T formed by the recording heads 4B and 5A bend in the same direction in the mode in which the recording track T is small even if the rotary drum 1 causes precession. Still more, no crosstalk between the respective channels occurs in the rotary transformer 8 in the both modes. It is noted that although the crosstalk between the respective channels in the rotary transformer 8 may be prevented by disposing the respective channels as described above, the present invention is not limited to that and the short ring may be disposed per channels which operate in the same timing for example.

Figure 8:
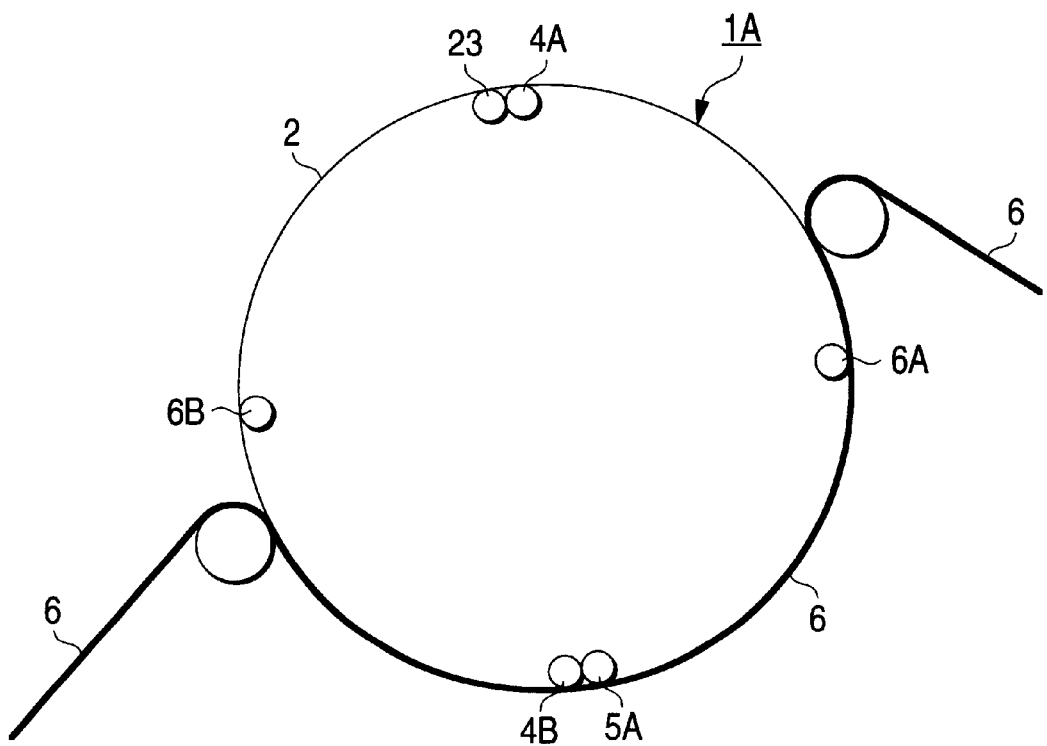
FIG. 8 is a schematic plan view showing a modified example of the rotary drum provided with a dummy head.
Figure 9:
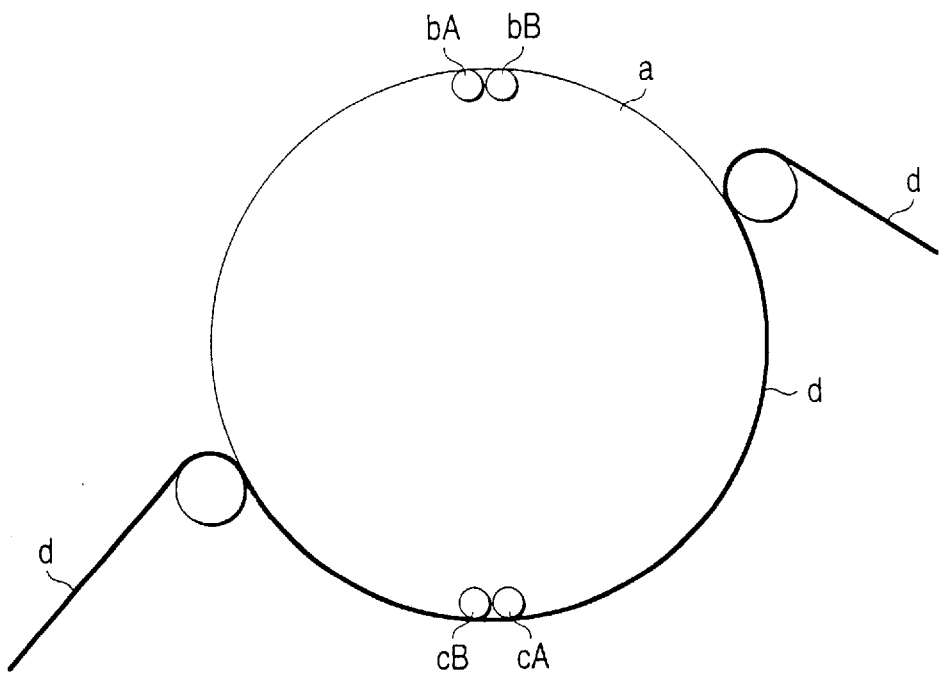
FIG. 9 shows one example of a prior art rotary drum together with FIGS. 9 through 11 and specifically is a plan view schematically showing a rotor side drum.
Figure 10:
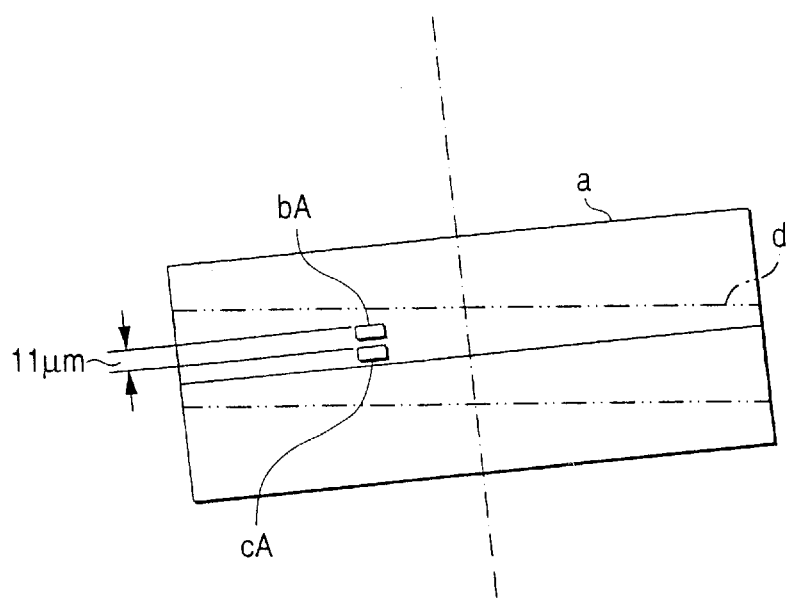
FIG. 10 is a schematic side view of the rotary drum.
Figure 11:
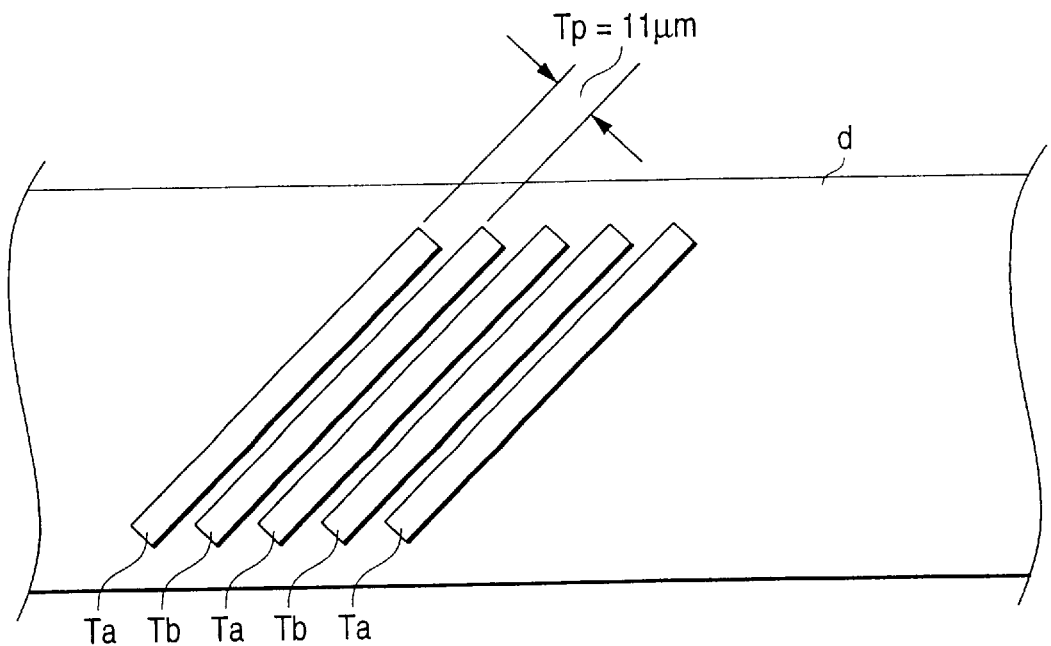
FIG. 11 is a recording pattern diagramatically showing tracks recorded on a magnetic tape.
Figure 12:
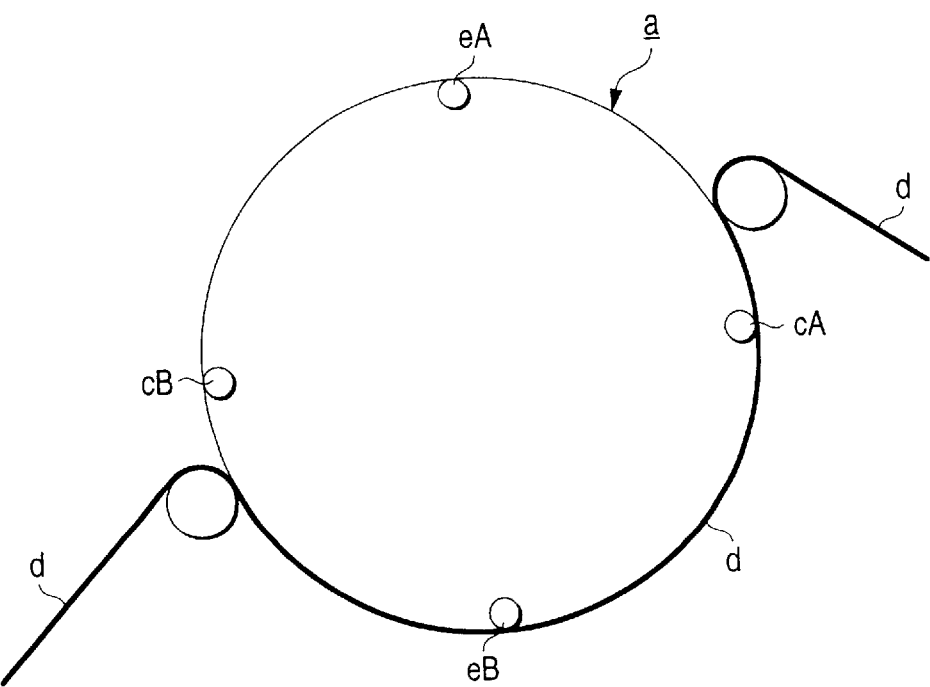
FIG. 12 is a schematic plan view showing one example of another prior art rotary drum.
Figure 13:
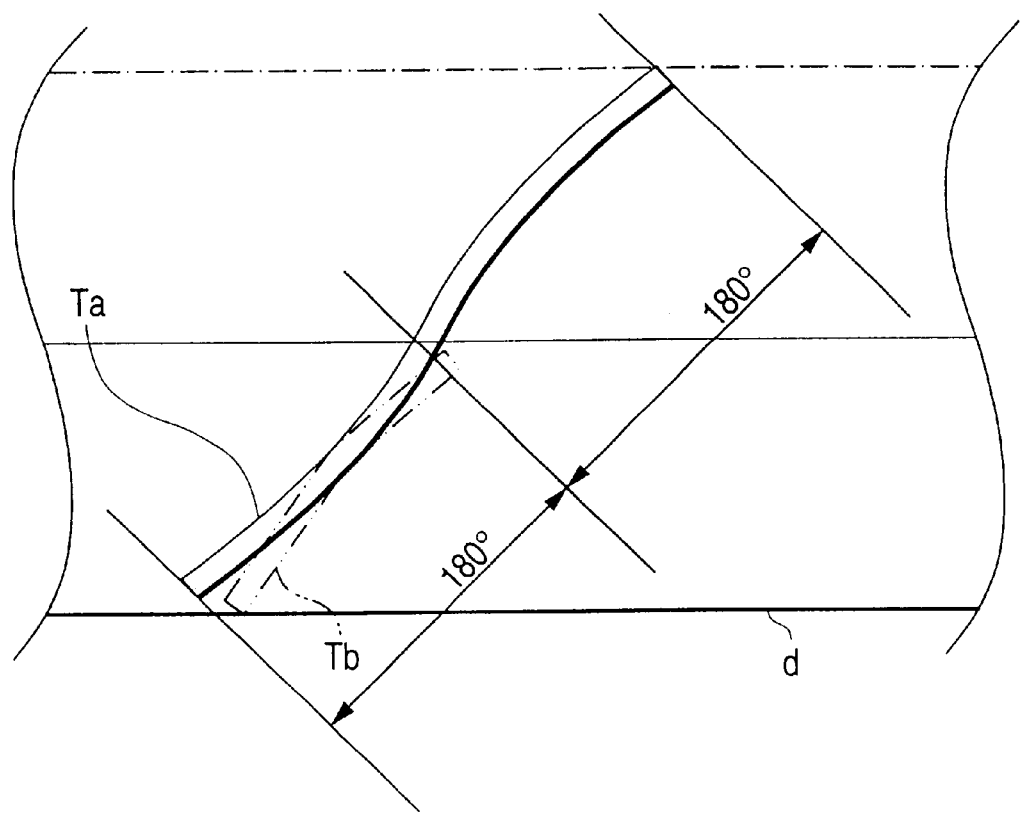
FIG. 13 is a recording pattern showing a problem of one example of the other prior art rotary drum.

FIG. 8 shows a modified example related to the disposition of the respective heads. It is different from the embodiment described above in that it is provided with a dummy head.

The dummy head 23 is provided at the same position in the circumferential direction with the recording head 4A and separately in the direction of the rotary shaft of the rotary drum 1A (in the direction of height of the rotary drum 1A) by 5.5 μm. It allows eccentricity of weight of the drum 1A to be eliminated.

That is, although there has been a possibility that the rotary drum 1 is put into the eccentric condition weightwise and causes nonuniformity of rotation when the recording heads 4A, 4B and 5A are disposed as described above in the embodiment described above, the modified example can prevent the nonuniformity of rotation because the respective recording heads 4A, 4B, 5A and the dummy head 23 are disposed symmetrically about the axis centering on the center of rotation.

It is noted that although the embodiment described above has been explained about the rotary drum 1 provided with the three recording heads 4A, 4B and 5A and the two reproducing heads 6A and 6B, the invention is not limited to such a case and may be carried out by providing four recording heads and four reproducing heads, for example. In such a case, a pair of reproducing heads having different azimuth angles, disposed in the same position in the circumferential direction and separated appropriately in the direction of height are disposed separately with 180° of central angle from each other and by having a gap in the direction of height. Thereby, two kinds of modes of operating the recording heads disposed in the same position in the circumferential direction and a mode of operating the recording heads at the position separated by 180° of central angle may be realized. When the recording heads at the position separated by 180° of central angle from each other are operated, a plurality of kinds of modes may be realized by changing the tape/head relative speed.

It is noted that the invention may be applied not only to a magnetic tape streamer drive unit known as a data recording apparatus for computer but also widely to ones having the function (RAW function) of checking recorded information while recording the information to a magnetic tape.

Still more, the concrete shape or structure of each part shown in the embodiments described above is merely a part of exemplary case in carrying out the invention and the technological scope of the invention should not be construed by them.

As described above, the inventive rotary drum comprises a pair of recording heads having different azimuth angles and disposed separately with 180° of central angle and a second recording head disposed at the same position in the circumferential direction with at least one recording head among the pair of recording heads while leaving a predetermined gap in the direction of height of the rotary drum and having a different azimuth angle from one recording head.

Accordingly, because the pair of recording heads are disposed separately with 180° of central angle on the inventive rotary drum, the plurality of modes may be realized with regard to the recording density of the magnetic tape by varying the tape/head relative speed. Further, because the second recording head is disposed by leaving the certain gap (gap in height) in the direction of height from one recording head, the parallel of the two recording tracks created by such gap in height may be maintained. Therefore, the recording density may be increased by setting a mode so that such gap in height becomes the smallest track pitch.

According to a second aspect of the invention, the drum further comprises a dummy head having almost the same mass with the second recording head at the position separated from the second recording head by 180° of central angle, so that it is possible to eliminate the weightwise eccentricity of the rotary drum and to prevent nonuniformity of rotation in rotating the drum.

The inventive magnetic tape recording/reproducing apparatus has a rotary drum comprising a pair of recording heads having different azimuth angles and disposed separately with 180° of central angle and a second recording head disposed at the same position in the circumferential direction with at least one recording head among the pair of recording heads while leaving a predetermined gap in the direction of height of the rotary drum and having a different azimuth angle from one recording head and two or more modes with regard to tape/head relative speed of tape recording medium.

Accordingly, because the pair of recording heads are disposed separately with 180° of central angle in the inventive magnetic tape recording/reproducing apparatus, the plurality of modes may be realized with regard to the recording density of the magnetic tape by varying the tape/head relative speed. Further, because the second recording head is disposed by leaving the certain gap (gap in height) in the direction of height from one recording head, the parallel of the two recording tracks created by such gap in height may be maintained. Therefore, the recording density may be increased by setting a mode so that such gap in height becomes the smallest track pitch.

What is claimed is:

1. A rotary drum, comprising:
   a pair of recording heads having different azimuth angles and disposed separately with 180° of central angle and having a predetermined first gap in a direction of height of said rotary drum; and
   a second recording head disposed at a same position in a circumferential direction with at least one recording head among said pair of recording heads while having a predetermined second gap in the direction of height of said rotary drum for a higher recording density, said second gap being smaller than said first gap, and said second recording head having a different azimuth angle from said one recording head.

2. The rotary drum according to claim 1, further comprising a dummy head having almost a same mass with said second recording head at a position separated from said second recording head by a central angle of 180°.

3. A magnetic tape recording/reproducing apparatus, comprising:
   a rotary drum comprising:
      a pair of recording heads having different azimuth angles and disposed separately with 180° of central angle and having a predetermined first gap in a direction of height of said rotary drum, and
      a second recording head disposed at a same position in a circumferential direction with at least one recording head among said pair of recording heads while having a predetermined second gap in the direction of height of said rotary drum for a higher recording density, said second gap being smaller than said first gap, and said second recording head having a different azimuth angle from said one recording head; and
   two or more modes with regard to tape/head relative speed of a tape recording medium.

4. The rotary drum according to claim 3, wherein at least one of said two or more modes includes forming first recording tracks using said pair of recording heads, and a second of said two or more modes includes forming second recording tracks using said one recording head and said second recording head.

* * * * *